C. H. FINSON.
Horse Rake.

No. 52,152.

Patented Jan'y 23, 1866.

Witnesses:
J. W. Porter
H. L. Simpson

Inventor:
Charles H. Finson

UNITED STATES PATENT OFFICE.

CHARLES H. FINSON, OF BANGOR, MAINE.

IMPROVEMENT IN HORSE-RAKES.

Specification forming part of Letters Patent No. 52,152, dated January 23, 1866.

*To all whom it may concern:*

Be it known that I, CHARLES H. FINSON, of Bangor, in the county of Penobscot and State of Maine, have invented a new and Improved Horse-Rake; and I do hereby declare that the following is a full, clear, and exact description of the construction and operation of the same, reference being had to the accompanying drawings, making a part of this specification, in which—

Figure 1:
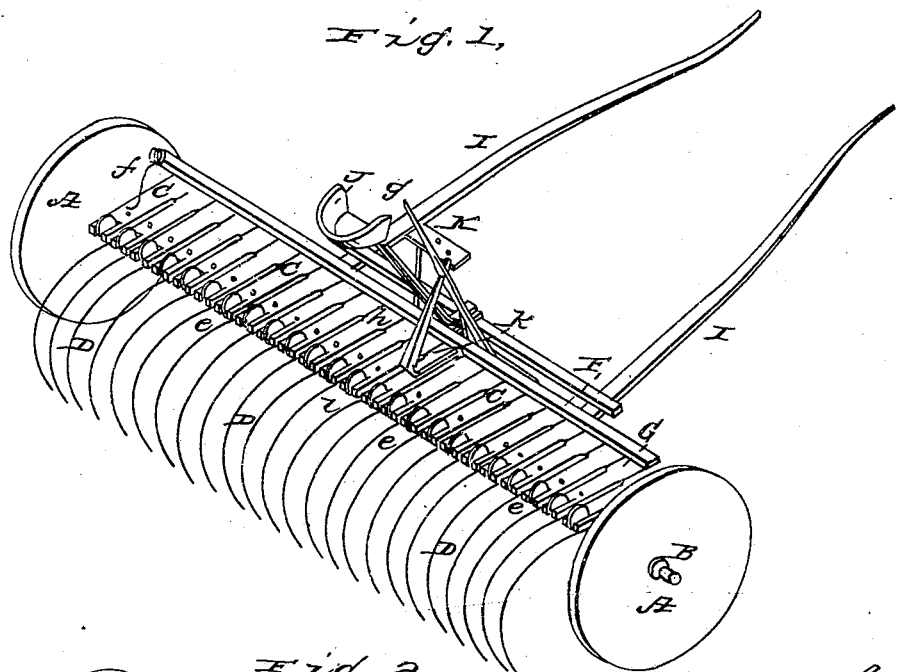
Figure 2:
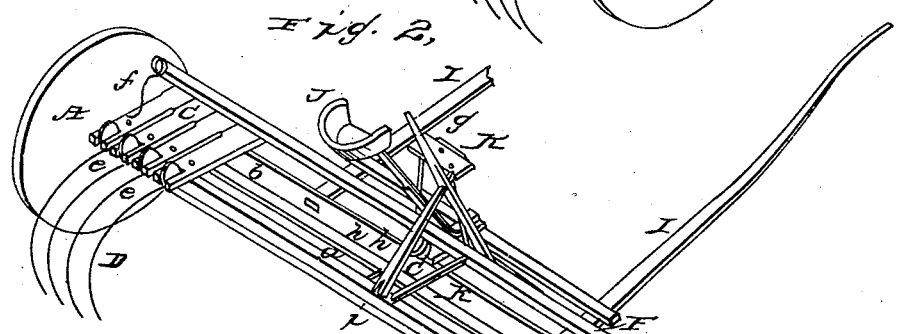
Figure 3:

Figure 1 is a perspective view of my rake complete. Fig. 2 is a perspective view of the rake with the most of the teeth removed; and Fig. 3 is a vertical section taken in the direction of the line of draft when working.

The nature of my invention consists in an improved manner of balancing the teeth upon a frame, which also serves as the means for tilting the rake.

In the drawings, A A represent the wheels. B is the axle. C C are the arms to which the teeth are attached. D D are the teeth. $a\,a$ are studs secured upright in the axle B. A rod, $b$, passes through these studs near their upper end. $c\,c$ are curved levers which vibrate upon the rod $b$. A rod, $d$, passes through these levers near their forward extremity in the curve, and upon this rod $d$ are secured the arms C, so as to play loosely.

Upon the rear end of levers $c$ is fixed the tilting-bar E, which passes under arms C. The teeth are tripped or raised to pass the windrow by actuating the lever $g$. This lever is hinged to the bar H', and is connected with the tripping-bar E by the connecting-rod $h$ and stud $i$. The bar F is secured to the forward ends of levers $c$, and serves the double purpose of securing them in place and checking the forward movement of arms C when tripped. A stay, $k$, is connected with bar F and stud $i$.

G is a short arm projecting forward from the axle, and to this arm and its counterpart are secured bars H and H', which constitute the platform upon which is secured the driver's seat J and foot-stool K. The shafts I I are also attached to the bars H and H', thus leaving the space between H and the axle open for the descent of arms C when tripped.

$f$ is an auxiliary spring secured to bar F and tending to depress arm C. This spring need only be used upon the most uneven land.

The teeth D may be attached to the arms C in any suitable manner. When the rake is to be used upon very rough land I insert a truck, $e$, in the end of arm C, and coil the tooth once or twice around the truck; but for use upon smooth land the teeth may be secured direct to the arms, as the coil is in such case unnecessary.

By pressing hand-lever $g$ forward the teeth are tripped or raised, the point or pivot of motion in tripping being rod $b$, the tripping-bar E insuring the ascent of all the teeth, while the front ends of arms C descend with the movement of levers $c$ in tripping. By pressing back hand-lever $g$ the tripping-bar E is depressed, thus leaving to arms C, when working, an independent rising-and-falling movement.

Having described the construction and operation of my invention, what I claim, and desire to secure by Letters Patent, is—

1. The combination of the teeth-arms C, bars E and F, and levers $c$, as and for the purposes specified.

2. The tilting device, as constructed, with levers $c$, bars E and F, and lever $g$, when arranged to operate substantially in the manner and for the purpose specified.

CHARLES H. FINSON.

Witnesses:
T. W. PORTER,
A. L. SIMPSON.